United States Patent
Rotea

(10) Patent No.: US 11,327,448 B2
(45) Date of Patent: May 10, 2022

(54) METHOD AND SYSTEM FOR USING LOGARITHM OF POWER FEEDBACK FOR EXTREMUM SEEKING CONTROL

(71) Applicant: Board of Regents, The University of Texas System, Austin, TX (US)

(72) Inventor: Mario A. Rotea, Allen, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 173 days.

(21) Appl. No.: 16/617,911

(22) PCT Filed: May 30, 2018

(86) PCT No.: PCT/US2018/035135
§ 371 (c)(1),
(2) Date: Nov. 27, 2019

(87) PCT Pub. No.: WO2018/222719
PCT Pub. Date: Dec. 6, 2018

(65) Prior Publication Data
US 2020/0110373 A1   Apr. 9, 2020

Related U.S. Application Data

(60) Provisional application No. 62/513,163, filed on May 31, 2017.

(51) Int. Cl.
*G05B 13/02* (2006.01)
*F03D 7/02* (2006.01)
*G05B 19/042* (2006.01)

(52) U.S. Cl.
CPC ......... *G05B 13/025* (2013.01); *F03D 7/0224* (2013.01); *F03D 7/0276* (2013.01);
(Continued)

(58) Field of Classification Search
CPC .............. G05B 13/025; G05B 19/0428; G05B 2219/37502; G05B 2219/2619;
(Continued)

(56) References Cited

U.S. PATENT DOCUMENTS

| | | | | | |
|---|---|---|---|---|---|
| 4,515,529 | A | * | 5/1985 | Woodhull | F03D 9/22 417/63 |
| 6,137,187 | A | * | 10/2000 | Mikhail | H02P 9/04 290/44 |
| 2016/0111883 | A1 | * | 4/2016 | Beekmann | H02M 7/04 307/82 |

FOREIGN PATENT DOCUMENTS

JP    92016046899 A    4/2016

OTHER PUBLICATIONS

Guillemette et al., "Maximizing Wind Farm Energy Production in Presence of Aerodynamic Interactions," Proceedings of the International Conference of Control, Dynamic Systems, and Robotics, Ottawa, Ontario, Canada, May 15-16, 2014, Paper No. 71, 8 pages.
(Continued)

*Primary Examiner* — Kenneth M Lo
*Assistant Examiner* — Jonathan Michael Skrzycki
(74) *Attorney, Agent, or Firm* — Yee & Associates, P.C.

(57) ABSTRACT

The present disclosure provides a method and system for optimizing a control process. The method and system comprise using a sensor to generate a feedback signal that represents a measured performance index for an extremum seeking control (ESC) method and sending the feedback signal to an ESC conditioning circuit that applies a logarithmic transformation to the feedback signal to obtain a modified feedback signal. An ESC controller applies the modified feedback signal to the ESC method to generate an output value that is used to control an actuator to maximize the performance of a machine or process.

8 Claims, 6 Drawing Sheets

(52) U.S. Cl.
CPC .. *G05B 19/0428* (2013.01); *G05B 2219/2619* (2013.01); *G05B 2219/37502* (2013.01)

(58) Field of Classification Search
CPC .... F03D 7/0224; F03D 7/0276; F03D 7/0204; F03D 7/046; Y02E 10/72; F05B 2270/20; F05B 2270/335
See application file for complete search history.

(56) References Cited

OTHER PUBLICATIONS

Creaby et al., "Maximizing Wind Turbine Energy Capture using Multivariable Extremum Seeking Control," Wind Engineering, vol. 33, No. 4, Jun. 2009, pp. 361-388.
PCT International Search Report, Regarding Application No. PCT/US2018/035135, dated Sep. 7, 2018, 4 pages.
European Patent Office, Examination Report, dated Jun. 17, 2021, regarding EP Application No. 18732582.4, 7 pages.

\* cited by examiner

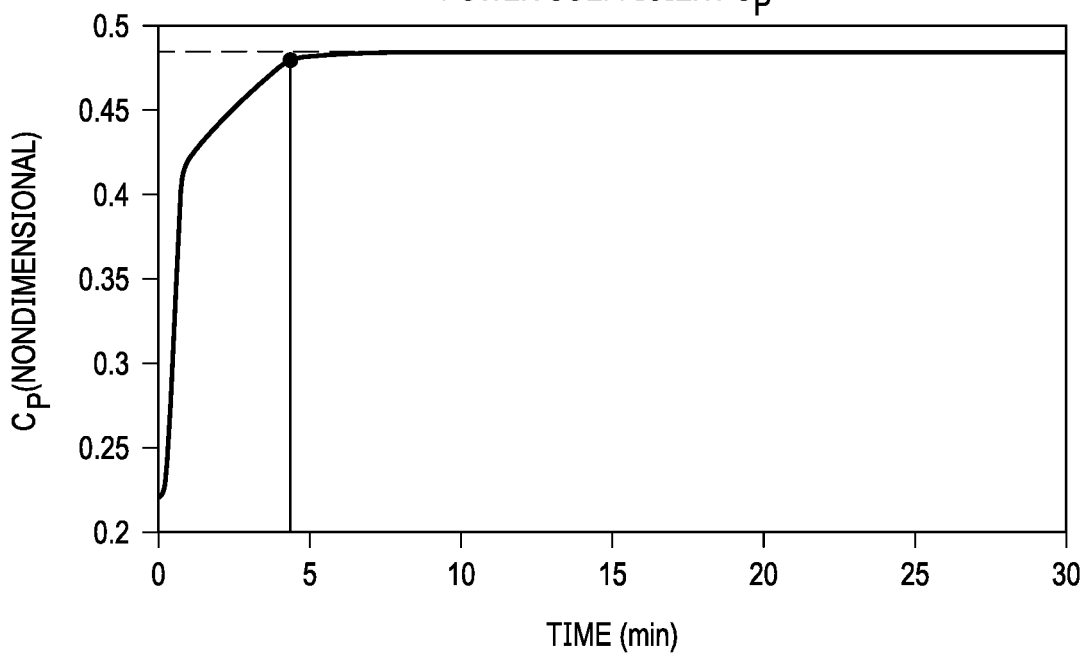
FIG. 8 POWER COEFFICIENT $C_P$
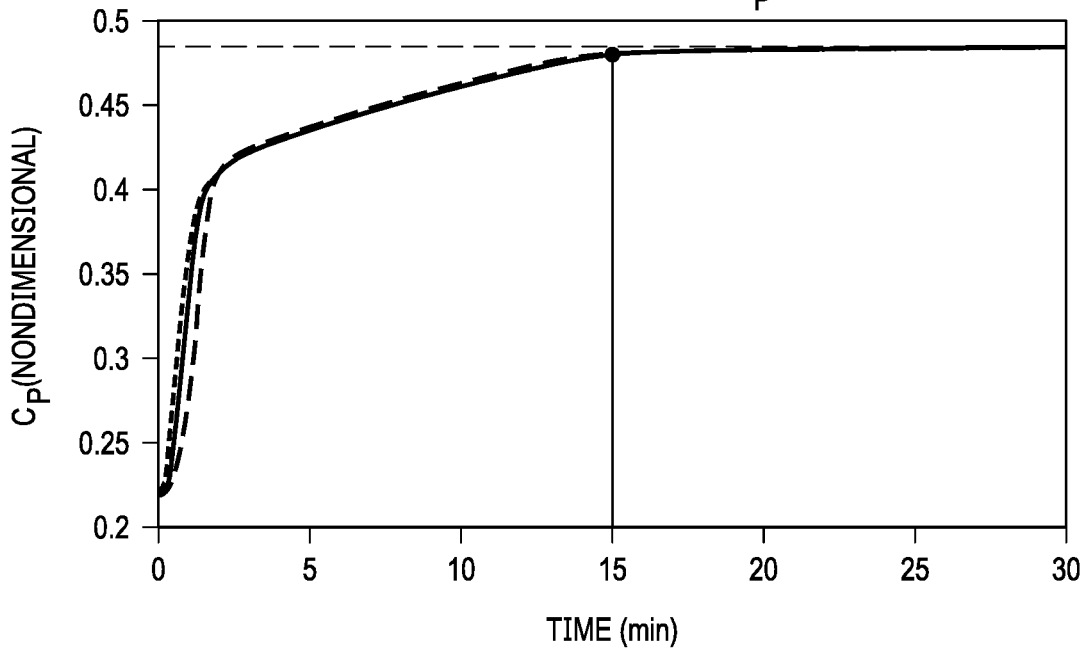
FIG. 9 POWER COEFFICIENT $C_P$

METHOD AND SYSTEM FOR USING LOGARITHM OF POWER FEEDBACK FOR EXTREMUM SEEKING CONTROL

BACKGROUND INFORMATION

1. Field

The present disclosure relates generally to a feedback control method for control optimization and, more specifically, to an improved application of extremum seeking control.

2. Background

Adaptive control is the method by which a controller must adjust a system that has varying or uncertain parameters. One such method of adaptive control is extremum seeking control (ESC). ESC is used to determine and maintain the extremum value of a function. In most applications, ESC tracks a varying maximum in a performance index and attempts to determine the optimal performance of the control system as it operates. The aim of employing ESC is to design a controller that drives system parameters to their performance-optimizing values, using only output measurements.

The ESC control algorithm has been proposed in the prior art to locate and track the point of optimal efficiency for power maximization in systems related to fluid dynamics. An illustrative example is maximizing power in a wind turbine. The current state-of-the-art applies the ESC to the power signal measured from the wind turbine. However, since the power signal is proportional to the cube of the wind speed, typical wind speed variations lead to significant variations in the performance of the ESC algorithm thereby making the behavior of the control system with the ESC dramatically inconsistent and extremely sensitive to inevitable changes in wind speed. This limits the use and value of the ESC algorithm for finding the most efficient point of operation.

Therefore, it is desirable to have a method and system that take into account at least the issues discussed above, as well as other possible issues.

SUMMARY

An embodiment of the present disclosure provides a method for optimizing performance of a control system. The method comprises using a sensor to generate a feedback signal that represents a measured performance index for an extremum seeking control (ESC) method and sending the feedback signal to an ESC conditioning circuit; using the ESC conditioning circuit to apply a logarithmic transformation to the feedback signal to obtain a modified feedback signal and sending the modified feedback signal to an ESC controller; using the ESC controller to apply the modified feedback signal to the ESC method; and controlling at least one actuator according to an output value generated by the ESC controller.

Another embodiment of the present disclosure provides a control system comprising a sensor configured to generate a feedback signal that represents a measured performance index for an extremum seeking control (ESC) method; an ESC conditioning circuit configured to apply a logarithmic transformation to the feedback signal to obtain a modified feedback signal; an ESC controller configured to apply the modified feedback signal to the ESC method; and at least one actuator controller configured to control an actuator according an output value generated by the ESC controller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is a curve depicting the response of power feedback ESC at a wind speed of 12 m/s in accordance with an illustrative embodiment; and FIG. 9 shows the combined response curves for log-of-power feedback ESC for different wind speeds in accordance with an illustrative embodiment.

DETAILED DESCRIPTION

The illustrative embodiments of the present disclosure take into account that, in fluid dynamics, power is a cubic function of fluid speed. As a result, the use of the extremum-seeking control (ESC) algorithm for adaptive control produces inconsistent results for optimizing efficiency (performance) in fluid dynamic systems when ESC uses a power measurement and the fluid speed changes with operating conditions.

The present disclosure applies a transformation to condition the measured power signal before feeding it to the ESC algorithm. Specifically, the disclosure applies the logarithm function to a properly normalized measurement of the power signal and uses the resulting conditioned signal as the input for identifying the optimal efficiency via the ESC algorithm. The present disclosure thereby produced the technical effect of optimizing performance of a fluid dynamic control system in a highly consistent and predictable manner despite inevitable variations in operating conditions.

The present disclosure can be applied to many types of fluid dynamic control systems. For illustrative purposes, the present disclosure focuses on application to wind turbines, but the underlying methodology of the present disclosure is by no means limited to that field.

Figure 1:
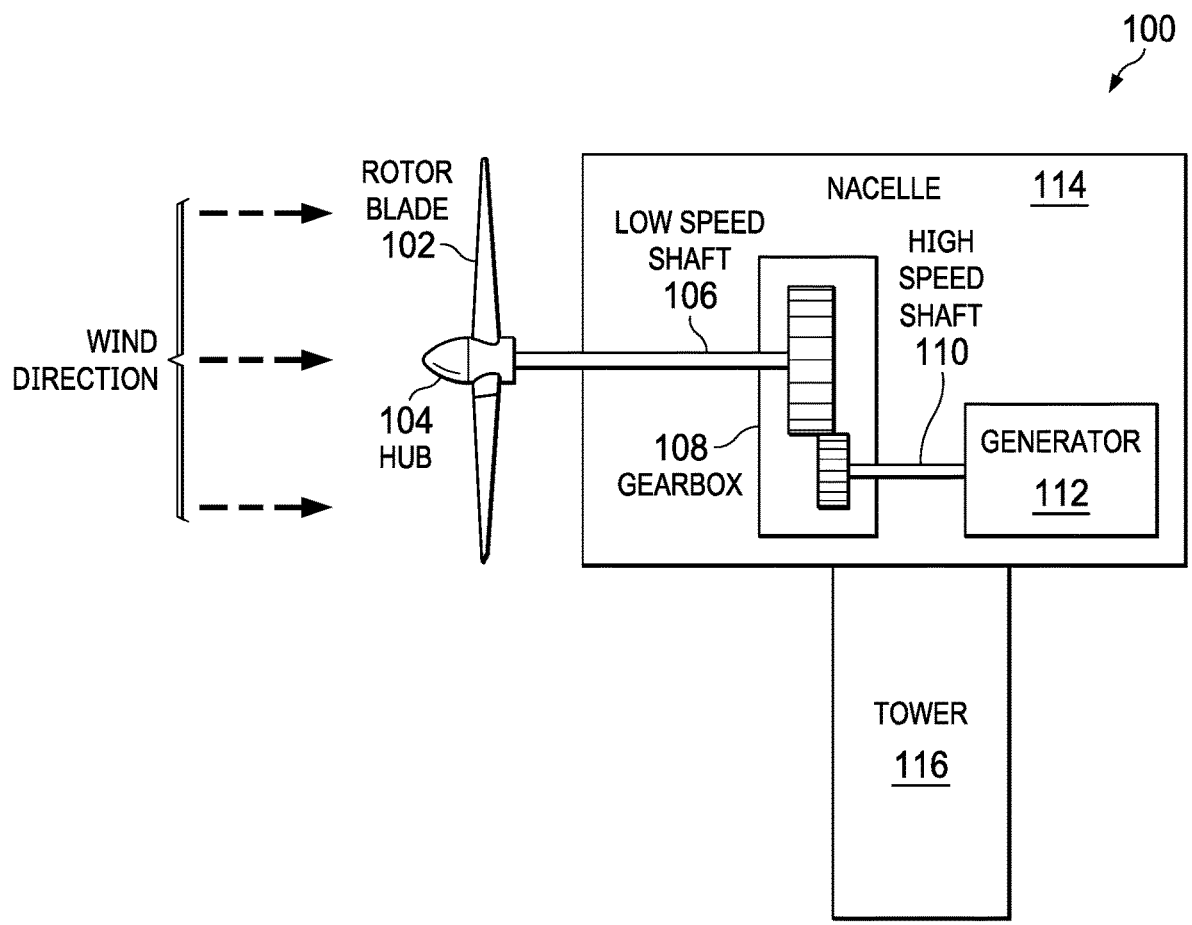
FIG. 1 is a diagram of a wind turbine in accordance with an illustrative embodiment.

Referring now to FIG. 1, a diagram of a wind turbine is depicted in accordance with an illustrative embodiment. The main components of the wind turbine 100 are enclosed in a nacelle 114 that is mounted atop a tower 116. As wind passes over the rotor blades 102 the lift generated by the airfoils exerts torque on the central hub 104, thereby rotating the low speed shaft 106. A gearbox 108 increases rotational speed from the low speed shaft 106 to a high speed shaft 110. A common ratio used with wind turbines is 90:1, e.g., a rotational speed of 15 rpm for low speed shaft 106 produces a rotational speed of 1350 rpm in high speed shaft 110. However, other ratios may be used for the gearbox 108. The high speed shaft 110 in turn drives a generator 112 to produce electricity.

Figure 2:
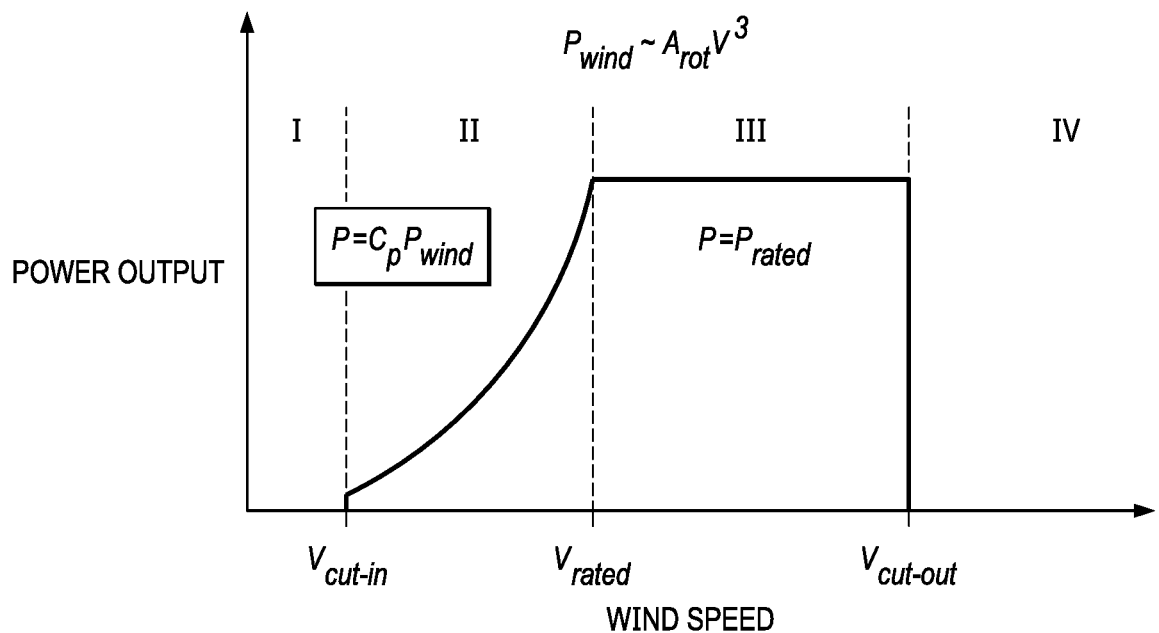
FIG. 2 is a power performance curve of a wind turbine in accordance with an illustrative embodiment.

Turning now to FIG. 2, a power performance curve of a wind turbine is depicted in accordance with an illustrative embodiment. The curve in FIG. 2 illustrates the fundamental challenge in maximizing performance of a wind turbine. The vertical axis represents the power output of the turbine, and the horizontal axis represents wind speed. The cut-in velocity $V_{cut-in}$ is the minimum wind speed necessary to cause the rotor blade to start turning. The cut-out velocity $V_{cut-out}$ is the maximum safe speed beyond which the turbine shuts down. This is typically achieved by a controller that adjusts the pitch angle of the rotor blades to eliminate lift in the airfoils.

For the purpose of the present discussion, a wind speed of importance is the rated velocity $V_{rated}$. This is the wind speed at which the turbine achieves its rated performance, where the generator produces its maximum rated power. The range of wind speed values between $V_{rated}$ and $V_{out-out}$ is known as region III and is the region in which the turbine will produce the maximum power output or rated power $P_{rated}$. Unfortunately, environmental conditions are rarely so ideal, and the turbine will spend a significant amount of time in region II, defined as the range of wind speeds between $V_{cut-in}$ and $V_{rated}$. The main objective of region II control is to maximize the power coefficient $C_p$ (also known as turbine efficiency) by adjusting the turbine's controls. ESC is used to adjust the turbine's control parameters to ensure that the turbine operates at maximum $C_p$ throughout its lifetime.

Additionally, the wind speed values that constitute region II are not fixed over the life of the turbine. In fact, region II wind speeds can change by a factor of 2× or higher. In addition, the performance characteristics (power coefficient $C_p$) of the turbine will change due to factors such as erosion on the surfaces of the rotor blades, buildup on the rotor blades, contamination in bearings in the hub such as sand, ice, etc. In essence, operational and environmental wear and tear will eventually degrade the performance characteristics of the turbine, thereby altering the performance curve in FIG. 2 over time. The present disclosure provides a method for optimizing performance within region II even as the boundaries of region II change over time.

Figure 3:
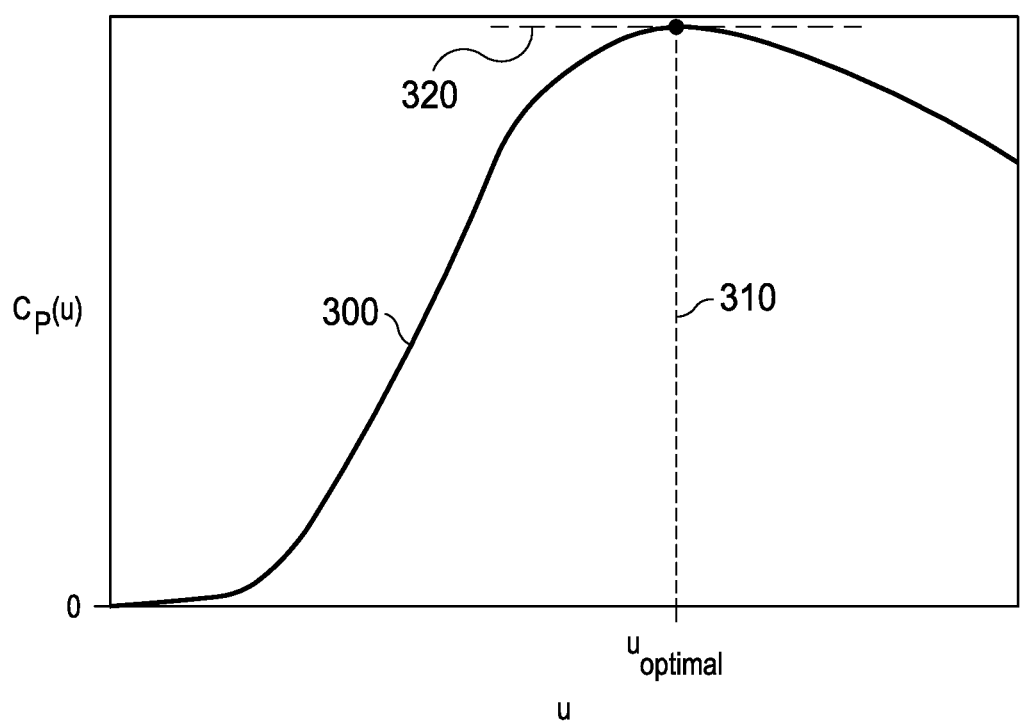
FIG. 3 is a curve depicting maximization of a power coefficient in accordance with an illustrative embodiment.

FIG. 3 is a curve depicting maximization of a power coefficient $C_P$ in accordance with an illustrative embodiment. The horizontal axis represents a control parameter u of the system. In the illustrative example of a wind turbine, u might be a control parameter such as blade pitch angle, turbine yaw, or reaction (or load) torque gain parameter. The vertical axis represents a power coefficient $C_P(u)$ that is a function of u. Curve 300 represents how the value of the power coefficient changes with u. As shown in FIG. 3, there is a value $u_{optimal}$, represented by line 310, at which the power coefficient $C_P(u)$ is maximized. This maximum level is represented by tangential line 320, i.e. a flat power curve. The goal of the optimization process is to match the flat line under variable operating conditions.

Figure 4:
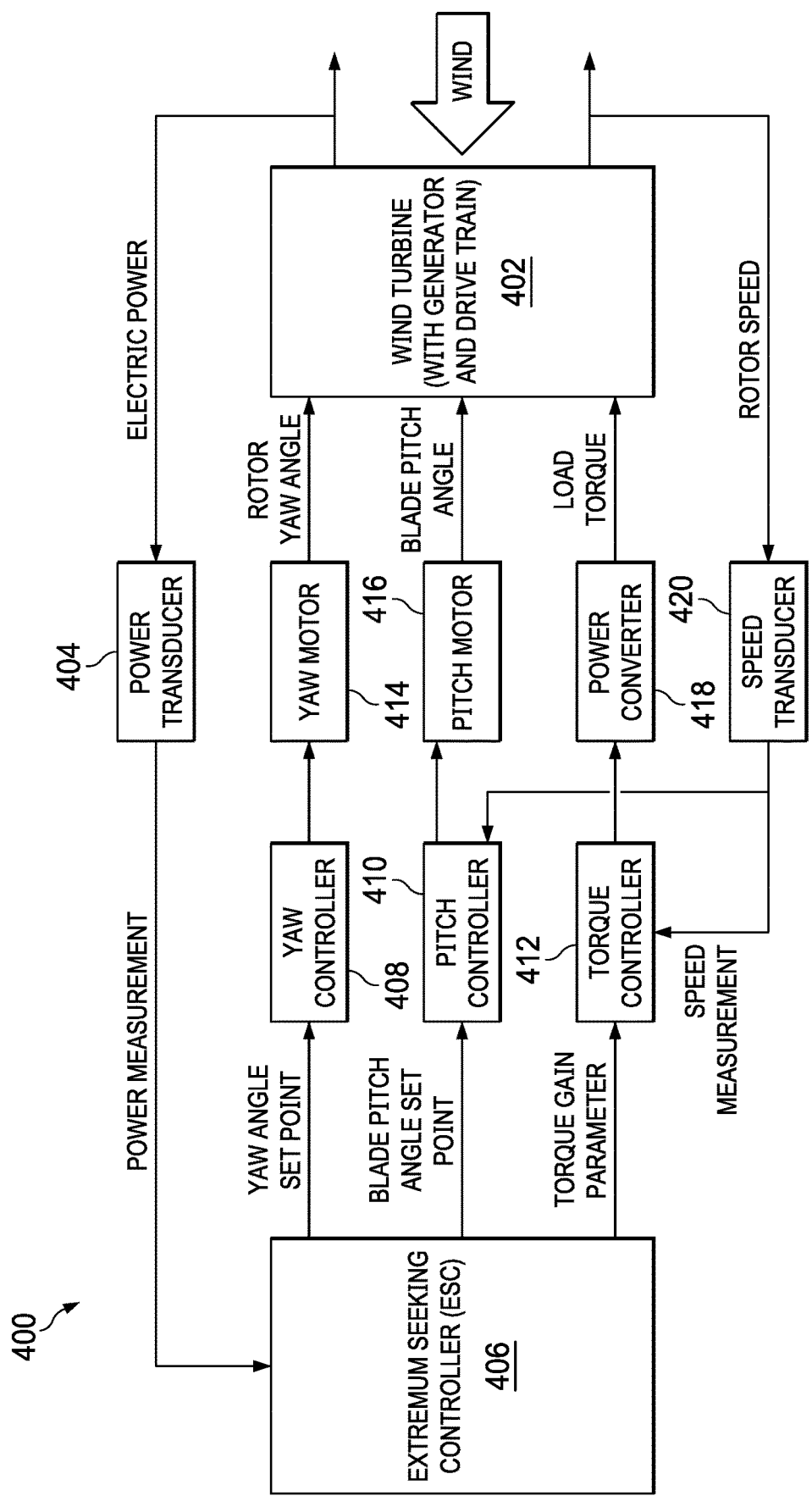
FIG. 4 is a block diagram of a feedback control system for a wind turbine operating in region II incorporating power-feedback ESC in accordance with an illustrative embodiment.

FIG. 4 is a block diagram depicting a feedback control system for a wind turbine operating in region II incorporating power-feedback ESC in accordance with an illustrative embodiment. The feedback control system 400 operates by detecting the power output produced by the wind turbine/generator 402 and uses the power-feedback ESC 406 to adjust one or more of the control parameters of the turbine in an attempt to optimize power output. In the case of a wind turbine in region II the three main control parameters affecting the performance are the blade pitch angle, the yaw angle of the turbine rotor, and the torque gain used in the torque controller 412.

As the turbine 402 produces electrical power in the generator through the drive train, the electrical power passes through a transducer 404, which sends a power measurement feedback signal to ESC controller 406. The ESC controller 406 is an electronic circuit that applies the performance index (power measurement) to the ESC algorithm to generate control parameters for the turbine 402. In the illustrative example shown in FIG. 4, there are three control parameters: yaw angle set point, blade pitch angle set point, and torque gain parameter.

The ESC controller 406 sends the calculated control parameters to respective controllers. In the illustrative example, there is a yaw controller 408, a blade pitch controller 410, and a torque controller 412. Using the yaw angle set point provided by the ESC controller 406, the yaw controller 408 sends commands to yaw motor 414 to adjust the rotor yaw angle of the turbine 402. Similarly, pitch controller 410 uses the blade pitch angle set point provided by the ESC controller 406 to send commands to pitch motor 416 to adjust the blade pitch angle. A torque controller 412 commands power converter 418 to adjust the load torque (reaction torque) of the generator in the turbine 402 according to the torque gain parameter value provided by the ESC controller 406.

In addition to monitoring the power output of the turbine 402, the rotor speed of the turbine is monitored by a speed transducer 420. The speed transducer 420 sends a speed measurement to the pitch controller 410 and torque controller 412.

Though pitch, yaw and load torque can all be employed in power optimization, experience has demonstrated that load torque is typically the most effective parameter to use for optimizing the power coefficient in region II. This mode of operation is used in variable speed turbines for region II power maximization.

As the high speed shaft rotates to drive the generator, the generator naturally produces reaction torque against the shaft, which acts as a brake on the shaft to control its speed. This load torque is controllable to adjust and control the speed of the turbine blades to match optimal efficiency. In this disclosure the ESC algorithm, with a properly conditioned power measurement, is used to match optimal power coefficient.

The ESC algorithm has several attributes that make it suitable for wind power maximization in region II: 1) The ESC requires feedback of the power signal only and does not require measurements of the wind speed; 2) the ESC is essentially a model-free algorithm that can be tuned with the turbine's step response; and 3) when properly tuned, the ESC operates well in the presence of zero-mean turbulent wind fluctuations.

However, when applying ESC to maximize power there is an inherent problem related to the nature of fluid dynamics. The rotor power P produced by a wind turbine is given in equation (1) below.

$$P = (\tfrac{1}{2}\pi R^2)\rho V^3 C_P(u) \qquad (1)$$

where P is power, R is rotor radius, ρ is air density, and $C_P(u)$ is the power coefficient that can be adjusted using the control parameter u. As can be seen in equation (1), the power signal is proportional to the cube of the wind speed V.

Performance optimization (maximization of power P) using ESC is described mathematically using equation (2).

$$\dot{u} = \kappa \frac{\partial P}{\partial u} = \kappa \left(\frac{1}{2}\pi R^2\right)\rho V^3 \frac{\partial C_p}{\partial u}(u) \propto V^3 \left(\kappa \frac{\partial C_p}{\partial u}(u)\right) \qquad (2)$$

where $\dot{u}$ is the time rate of change of u, and κ is the step size of the ESC algorithm. The goal of ESC is to drive to $\dot{u}$ zero, which implies that the slope of the power curve is flat $$\left(\text{i.e. } \frac{\partial C_p}{\partial u} = 0\right),$$

as represented by line 320 in FIG. 3. However, as a result of the cubic relationship to wind velocity in equation (2), $\dot{u}$ can vary dramatically due to changing wind conditions. The consequences of this wide variability are shown in FIGS. 6-8.

Figure 6:
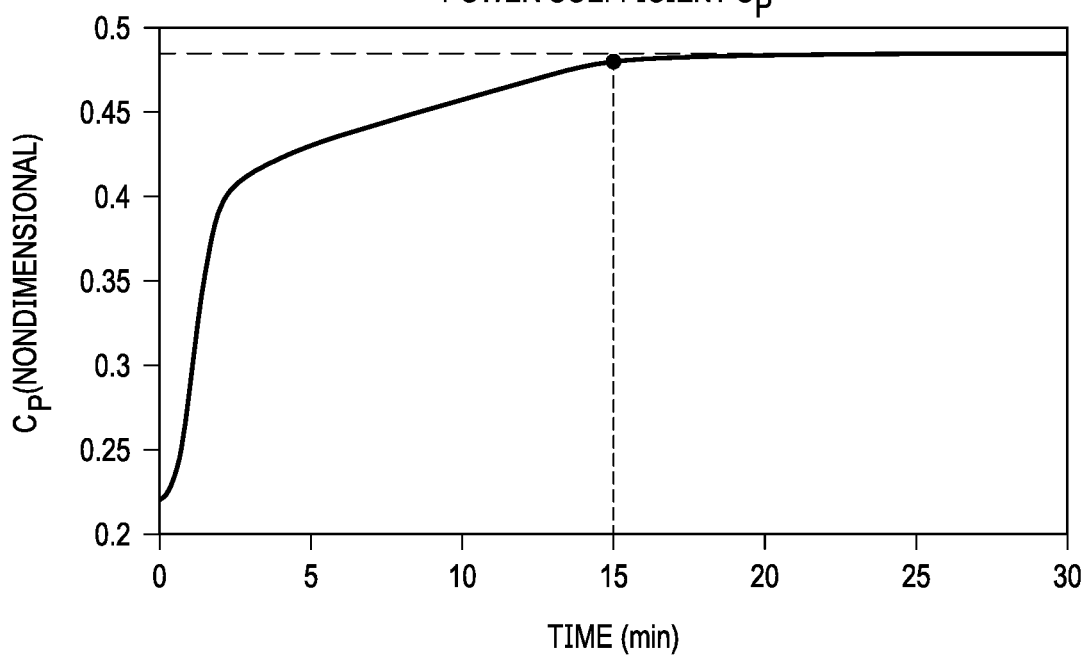
FIG. 6 is a curve depicting the response of power feedback ESC at a wind speed of 8 m/s in accordance with an illustrative embodiment.
Figure 7:
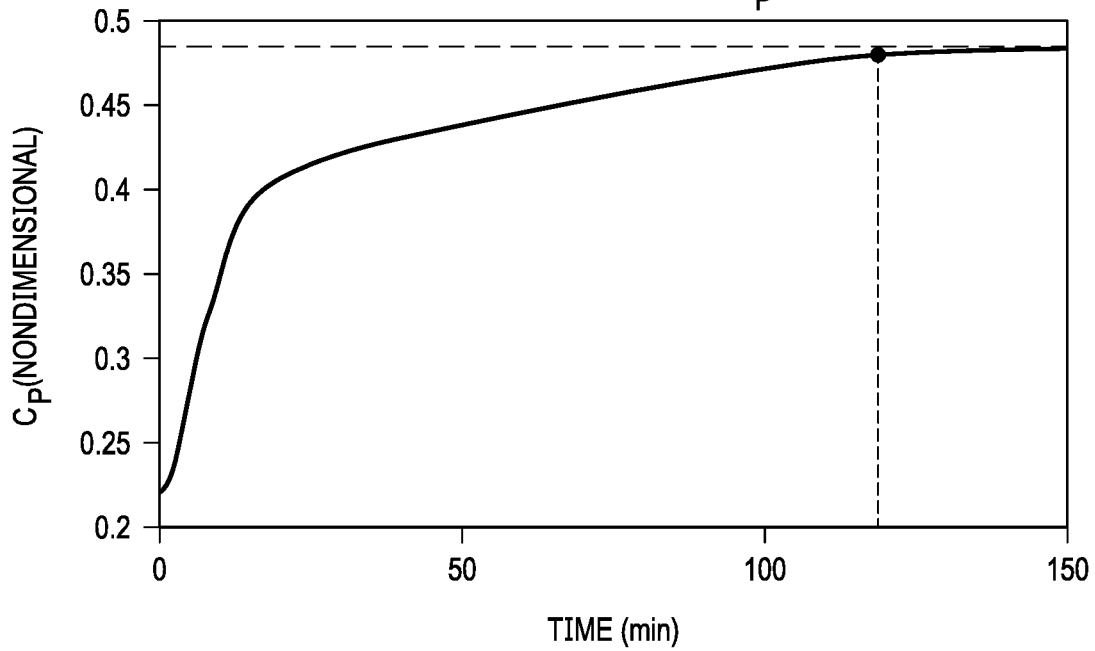
FIG. 7 is a curve depicting the response of power feedback ESC at a wind speed of 4 m/s in accordance with an illustrative embodiment.

FIG. 6 is a curve depicting the response of power feedback ESC at a wind speed of 8 m/s in accordance with an illustrative embodiment. This curve is an illustrative example based on a computer simulation using the 5-MW National Renewal Energy Laboratory (NREL) wind turbine. The parameters of the simulation are shown in Table 1.

TABLE 1

Properties of 5-MW NREL Turbine.

| | |
|---|---|
| Rated power | 5 MW |
| Rotor orientation, configuration | upwind, 3 blades |
| Rotor diameter (R) | 126 m |
| Rotor inertia (I) | 35444067 kg · m² |
| Cut-in wind speed | 3 m/s |
| Rated wind speed | 11.4 m/s |
| Cut-out wind speed | 25 m/s |

The air density is taken as ρ=1.225 kg/m³, the maximum power coefficient $C_P^{max}$=0.49. The step size κ is selected for a specified settling time (15 minutes) at a typical region II wind speed of 8 m/s.

FIG. 6 shows the time series of the power coefficient. The ESC step size is tuned to achieve a 1% settling time of 15 minutes for the power coefficient, meaning it takes 15 minutes for the power coefficient to reach 99% of its maximum value.

FIG. 7 is a curve depicting the response of power feedback ESC at a wind speed of 4 m/s in accordance with an illustrative embodiment. In this illustrative example, the same parameters are used as those described above with respect to FIG. 6, except the wind speed is 4 m/s. Under these conditions, it takes 2 hours for the power coefficient to reach 99% of its maximum. Therefore, at a wind speed of V=4 m/s the ESC algorithm is eight times slower to make the adjustment than at V=8 m/s. This longer time to settle to the optimum is not acceptable in real applications.

FIG. 8 is a curve depicting the response of power feedback ESC at a wind speed of 12 m/s in accordance with an illustrative embodiment. Once again, the same parameters are used as those described above with respect to FIG. 6, except in this example the wind speed is assumed to be 12 m/s. As shown in FIG. 8, the 1% setting time at V=12 m/s is 4.4 minutes. While superficially this might appear as a positive result, when one considers the inertial masses involved with wind turbines or other large fluid dynamic systems, attempting such rapid changes in reaction generator torque could cause significant mechanical stress and damage to the equipment.

As FIGS. 6-8 show, the ESC algorithm with power feedback is very sensitive to variations in the wind speed V, with settling times varying from minutes to hours.

The present disclosure overcomes this deficiency in the ESC algorithm by applying a logarithmic function to the feedback signal before applying the ESC algorithm to the signal.

Taking the natural log of the power signal prior to applying it to the ESC algorithm results in equation (3).

$$\dot{u} = \kappa \frac{\partial \ln P}{\partial u} = \kappa \frac{1}{C_P(u)} \frac{\partial C_p}{\partial u}(u) \qquad (3)$$

where lnP is the natural log of P. As can be seen in equation (3), by taking the log of power P, the wind speed V is no longer a factor in the log-of-power ESC equation (3), and the properties of the gradient algorithm (the foundational algorithm for ESC) depend only on the power coefficient $C_P(u)$ and the step size κ. This makes the ESC insensitive to changes in exogenous variables such as the wind speed. Mathematically, the logarithmic transformation has the effect of decoupling what is being maximized (the power coefficient $C_P$) from what is being measured (the power produced P).

Figure 5:
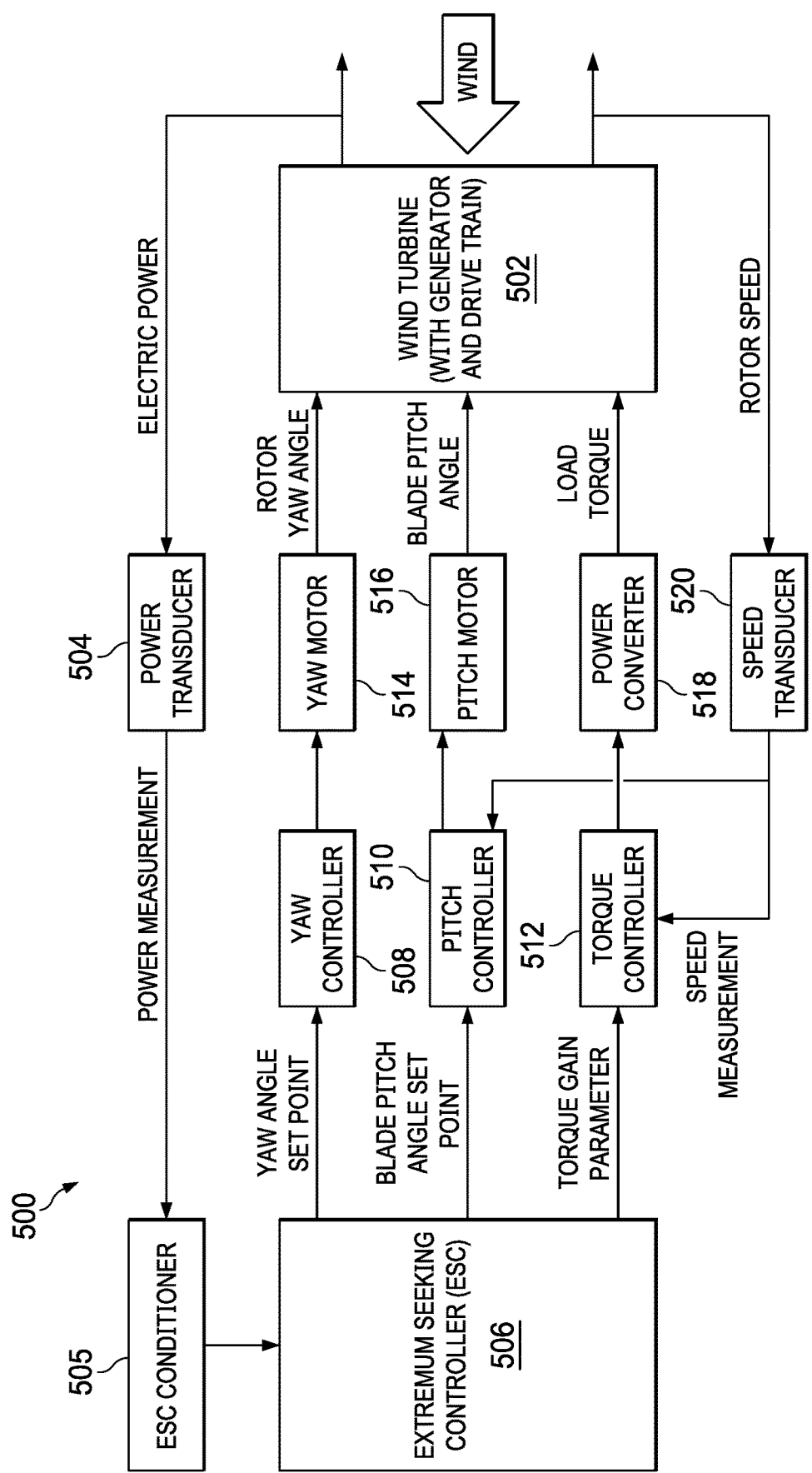
FIG. 5 is a block diagram of a feedback control system for a wind turbine operating in region II incorporating a log-of-power feedback ESC in accordance with an illustrative embodiment.

FIG. 5 is a block diagram depicting a feedback control system 500 for a wind turbine operating in region II incorporating a log-of-power transformation in accordance with an illustrative embodiment. In this embodiment, an ESC conditioning circuit 505 is positioned between the power transducer 504 and the ESC controller 506. This ESC conditioner 505 receives the power measurement feedback signal from the power transducer 504 and applies the logarithmic transformation lnP to obtain a modified feedback signal. It then sends this modified feedback signal to the ESC controller 506. The ESC controller 506 applies the modified feedback signal to the ESC algorithm and generates the parameter values for the controllers 508-512 to apply to the actuators 514-518.

FIG. 9 shows the combined response curves for log-of-power feedback ESC for different wind speeds in accordance with an illustrative embodiment. As in the case shown in FIG. 6, the step size κ is set to achieve a 1% settling time of 15 minutes when V=8 m/s. In FIG. 9, the solid power coefficient curve represents the time series corresponding to a wind speed of 8 m/s, the dashed power coefficient curve corresponds to a wind speed of 4 m/s, and the dotted power coefficient curve corresponds to a wind speed of 12 m/s. As can been seen the power coefficient curves are almost identical. Therefore, by applying log-of-power feedback to the ESC algorithm, the present disclosure produces the technical effect of increased system robustness to variations in mean wind speed, thereby resulting in settling times that remain close to constant across all possible wind speeds V in region II.

It will be understood by those skilled in the art that the log-of-power ESC control method described in the present disclosure can be generalized to other fluid control systems besides wind turbines. Examples of other fields of application of the present method include heating, ventilation, and air conditioning (HVAC) systems, refrigeration and cooling systems, fluid pump controls, and compressors. The log-of-power ESC method of the present disclosure can be applied to any type of rotating machinery or system in which fluid is the working medium and changes in inlet flow characteristics have a negative effect on performance maximization (e.g., efficiency maximization).

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An improved method for controlling and optimizing performance of a machine dependent on fluid flow therethrough, the machine having a set of parameter controllers by which performance of the machine is controlled, the method being of the type utilizing a control system responsive to a power-related parameter characterizing working medium throughput of the machine, wherein the improvement comprises:
    using a sensor to generate a feedback signal that measures the power-related parameter for an extremum seeking control method;
    sending the feedback signal from the sensor to an extremum seeking control conditioning circuit configured to apply a logarithmic transformation to the feedback signal to obtain a modified feedback signal;
    sending the modified feedback signal from the extremum seeking control conditioning circuit to an extremum-seeking control controller configured to perform control according to the extremum seeking control method and to generate a set of output signals, the set of output signals having at least one member, each of the output signals responsive to the modified feedback signal and configured to control a corresponding one of the parameter controllers of the set of parameter controllers; and
    sending each output signal of the set of output signals to the corresponding one of the parameter controllers so as to control and optimize performance of the machine.

2. The improved method of claim 1, wherein the fluid is air.

3. The improved method of claim 2, wherein the machine includes a turbine.

4. The improved method of claim 3, wherein each output signal in the set of output signals is configured to be coupled to a controller selected from the group consisting of a yaw controller to control turbine yaw angle, a pitch controller to control blade pitch angle of a set of blades in the turbine, the set of blades having at least one member, a torque controller to control load torque on the turbine, and combinations thereof.

5. An improved control system for controlling and optimizing performance of a machine dependent on fluid flow therethrough, the machine having a set of parameter controllers by which performance of the machine is controlled, the control system being of the type responsive to a power-related parameter characterizing working medium throughput of the machine, wherein the improvement comprises:
    a sensor configured to generate a feedback signal that measures the power-related parameter for an extremum seeking control method;
    an extremum seeking control conditioning circuit coupled to the sensor and configured to apply a logarithmic transformation to the feedback signal to obtain a modified feedback signal;
    an extremum seeking control controller coupled to the extremum seeking control conditioning circuit and configured to perform control according to the extremum seeking control method and to generate a set of output signals, the set of output controllers having at least one member, each of the output signals responsive to the modified feedback signal and configured to control a corresponding one of the parameter controllers of the set of parameter controllers; and
    wherein the extremum seeking control controller is configured to be coupled to the machine in a manner wherein each output signal of the set of output signals is coupled to the corresponding one of the parameter controllers to as to control and optimize performance of the machine.

6. The improved control system of claim 5, wherein the fluid is air.

7. The improved control system of claim 6, wherein the machine includes a turbine.

8. The improved control system of claim 7, wherein each output signal in the set of output signals is configured to be coupled to a controller selected from the group consisting of a yaw controller to control turbine yaw angle, a pitch controller to control blade pitch angle of a set of blades in the turbine, the set of blades having at least one member, a torque controller to control load torque on the turbine, and combinations thereof.

* * * * *